United States Patent [19]

Johnston Jr.

[11] Patent Number: 4,907,929
[45] Date of Patent: Mar. 13, 1990

[54] BOLT AND NUT COVER

[76] Inventor: Raymond B. Johnston Jr., 136 Bellwood Ct., Mars, Pa. 16046

[21] Appl. No.: 934,764

[22] Filed: Nov. 25, 1986

[51] Int. Cl.[4] .............................................. F16B 37/14
[52] U.S. Cl. ..................................... 411/431; 411/377; 411/908; 411/910
[58] Field of Search ............................... 411/429–431, 411/373–377, 907, 908; 109/50, 51, 52

[56] References Cited

U.S. PATENT DOCUMENTS

| | | | |
|---|---|---|---|
| 1,959,291 | 5/1934 | Millice | 109/51 |
| 3,134,290 | 5/1964 | Jentoft | 411/377 |
| 3,548,704 | 12/1970 | Kutryk | 411/373 |
| 4,295,767 | 10/1981 | Temple, Jr. | 411/377 |
| 4,400,123 | 8/1983 | Dunegan | 411/373 |
| 4,557,654 | 12/1985 | Masuda et al. | 411/431 |
| 4,582,462 | 4/1968 | Thiel | 411/431 |

FOREIGN PATENT DOCUMENTS

| | | | |
|---|---|---|---|
| 1943053 | 4/1968 | Fed. Rep. of Germany | 411/431 |
| 636531 | 3/1962 | Italy | 411/429 |

Primary Examiner—Neill R. Wilson
Attorney, Agent, or Firm—Kirkpatrick & Lockhart

[57] ABSTRACT

A cover for the end of a bolt to which a nut is attached is provided. The cover includes a body having an open end which is communication with an internal cavity. The internal cavity includes a first section of the shape of the nut and a second section. The second section of the internal cavity is cylindrical and is of a diameter between the outer and inner thread diameters of the bolt. In operation, the cover is forced over the bolt and nut such that the first internal cavity section surrounds the nut and the second internal cavity section engages the threads. By virtue of the interference fit provided, the cover may not readily be removed.

19 Claims, 1 Drawing Sheet

BOLT AND NUT COVER

BACKGROUND OF THE INVENTION

1. Field of the Invention

The present invention relates to bolt covers and, in particular, to a cover for the end of a bolt which also covers a nut attached thereto.

2. Description of the Invention Background

In various applications, a threaded bolt is screwedly engaged by a threaded nut such that a certain length of the bolt extends beyond the height of the nut. For example, a pole which supports an object such as a sign, light or traffic signal may be secured to the ground by means of anchor bolts. Anchor bolts are commonly formed of steel and are embedded in a concrete foundation. A base plate of the pole is provided with apertures which pass over the bolt and is secured by nuts which attach to the top portion of the anchor bolt. It will be readily appreciated that the connection of the pole to the ground in this manner is most important for the stability of the pole.

For various reasons, it is useful to provide some mechanism for covering the exposed end of a bolt such as those which may be employed to anchor a pole to the ground. A principal reason for providing a cover for the end of a bolt is safety. The upwardly extending end of an uncovered bolt could cause serious personal injury if one were to fall on to the bolt. Secondly, bolt covers are used to prevent corrosion of the bolt. The effect of normal corrosive action on an anchor bolt is known to lessen the diameter thereof thus weakening it and providing less stability to the overall structure. Finally, bolt covers are employed in order to improve the aesthetics of a bolt installation.

Heretofore, various types of anchor bolt covers have been proposed to address the above-indicated concerns. One previous means of covering anchor bolts is by the use of a steel or aluminum casting or a fabricated cover passing over the bolts and which may be attached to the pole or the base plate by a suitable fastening means such as screws. The problem with such covers is that additional holes must be drilled and tapped in the pole or the base plate to receive the screws. These holes must either be protected during the galvanizing or painting of the pole and, hence, its screw holes or the screw holes must be retapped after such operations. In addition, the fabrication and installation costs of such covers are considerable. Further, most previous fabricated anchor bolt covers extend from the anchor bolt to the pole. Of course, as the pole shaft size varies or the anchor bolt spacing varies, a variety of cover sizes are required. It will be appreciated, therefore, that fabricated anchor bolt covers are often unacceptably costly for various reasons.

Another type of bolt protector consists of a thread protector. A thread protector formed of a vinyl material may be of a relatively small thickness so that it may be molded by hand to the shape of the thread to be protected. Metal thread protectors normally must have an internal thread cut therein which is threaded onto the anchor bolt. Obviously, metal thread protectors are relatively expensive and easily removed by unthreading. In addition, neither of these forms of thread protectors are able to cover the nut as well as the end of the bolt.

A further type of bolt end protection consists of an acorn nut. An acorn nut is a nut which has an axial hemispherical body attached thereto. However, due to the provision of the hemispherical body, acorn nuts may only be applied a small distance along the length of the end of the bolt. The hemispherical portion prevents the application of the nut along greater lengths of the bolt. Additionally, acorn nuts must be obtained for each thread configuration involved and are also easily removed by unthreading.

The subject invention is directed toward an improved means for covering the end of a bolt and a nut attached thereto which overcomes, among others, the above-discussed problems and provides a secure, readily applied and inexpensive cover for the end of a bolt and an attached nut.

SUMMARY OF THE INVENTION

In accordance with the present invention, there is provided a cover for the end of a bolt and a nut screwedly attached thereto. The cover includes a unitary body having an outer shape which may consist of a cylinder to which there is attached a hemisphere.

The cover is provided with an inner cavity which includes first and second sections for receiving the nut and bolt, respectively. The first section of the internal cavity terminates at an open end of the body and is generally conformed to the outer axial shape of the nut. The second section of the cavity comprises a cylinder which extends away from the end of the body a distance greater than the height of the bolt above the nut. The diameter of the second section of the cavity is slightly less than the outer diameter of the bolt threads. As such, an interference fit occurs between the inner surface of the second portion of the cavity and the bolt threads.

For installation, the cover is positioned over a bolt and nut such that the flat portions of the first section of the internal cavity correspond to the flat sections of the nut. The cover is then forced down over the nut and the bolt so that the first internal section passes over the nut and the second internal section is caused to engage the bolt. Due to the interference fit between the second section and the outer thread diameter of the bolt, the threads are caused to engage the second section and become embedded therein. Such embedding prohibits the axial removal of the cover from the bolt while the cooperation of the shape of the first internal cavity with the nut prohibits the unscrewing of the cap from the bolt and nut.

Accordingly, the present invention provides solutions to the aforementioned problems present with previous bolt end protectors. As the present invention provides an effective, secure, readily-applied and efficient cover for both the bolt and the nut, the problems presented by unprotected bolts are alleviated. In addition, due to its relatively simple construction, the present invention solves the problems presented by complicated bolt end protectors while being inexpensive in cost.

These and other details, objects and advantages of the invention will become apparent as the following description of the present preferred embodiment thereof proceeds.

BRIEF DESCRIPTION OF THE DRAWINGS

In the accompanying drawings, I have shown a present preferred of the invention wherein.

DETAILED DESCRIPTION OF THE PREFERRED EMBODIMENTS

Figure 1:
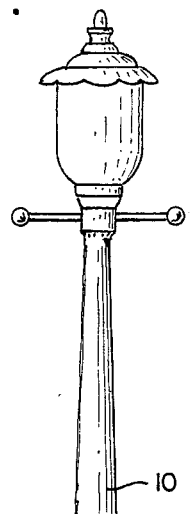
FIG. 1 is a side elevation view of a suitable application of the invention.
Figure 2:
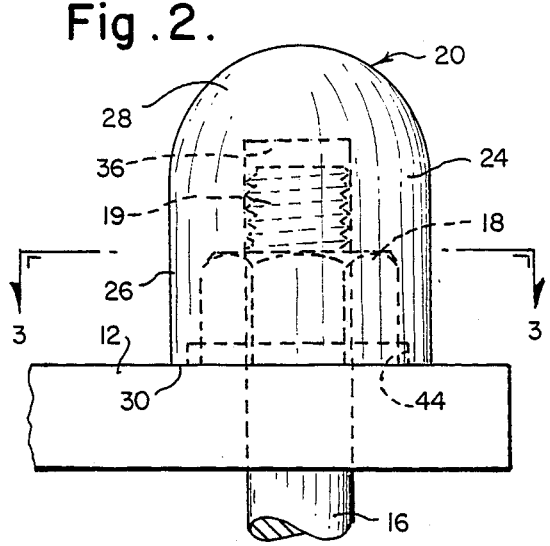
FIG. 2 is a side elevation view of the present invention as applied to a bolt and nut which are shown in phantom lines.
Figure 3:
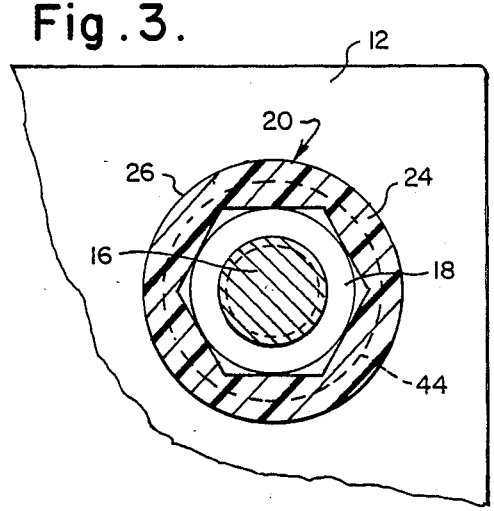
FIG. 3 is a cross-sectional view of the present invention as taken along lines 3—3 in FIG. 2.
Figure 5:
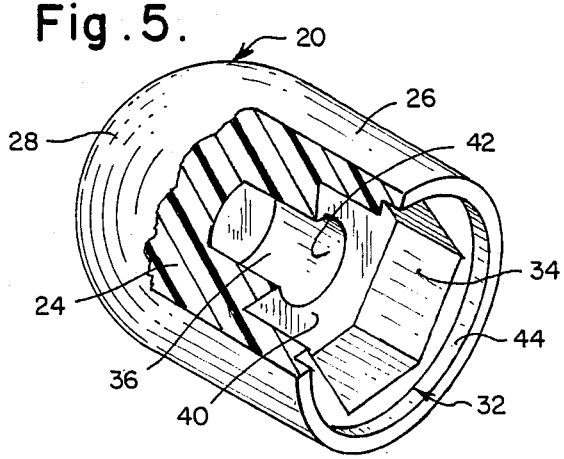
FIG. 5 is an isometric cut-away view of the bolt and nut cover of the instant invention.
Figure 4:
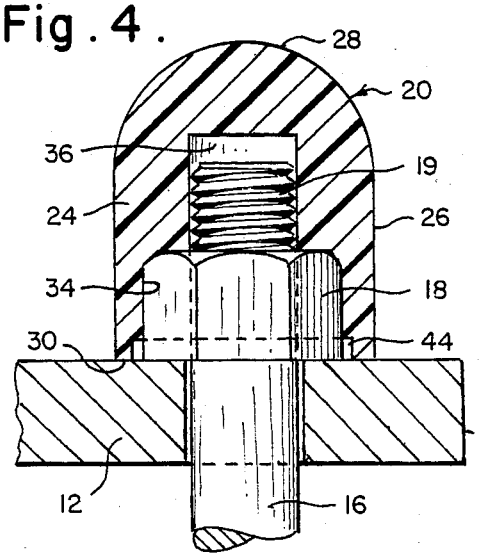
FIG. 4 is a cross-sectional elevational view of the bolt and nut cover according to the present invention.

For the purposes of the present invention, reference will be made to a bolt cover which is employed to cover the end of an anchor bolt and the nut used to secure a pole to the ground. However, it must be appreciated that the present bolt and nut cover may be applied in any application in which a nut is screwedly applied to a bolt such that the threads of the bolt extend beyond the nut height.

Referring now to the drawings wherein the showings are for purposes of illustrating the present preferred embodiment of the invention only and not for purposes of limiting same, the FIGURES show a lamp post 10 having a base plate 12 which is secured to a concrete foundation 14 by means of anchor bolts 16. A nut 18 threaded onto and passing over the threaded end of the bolt 16 secures the base plate 12 to the anchor bolt 16. In many applications, the nut 18 will be applied to bolt 16 such that a predetermined length of threads 19 of the bolt 16 extend beyond the height of the nut. In order to protect the exposed end of the anchor bolt 16 and the nut 18, a bolt and nut cover 20 is provided according to this invention.

The cover 20 consists of a body 24 having an outer surface which may include a cylindrical portion 26 and a hemispherical portion 28 formed in axial communication therewith. It will be appreciated, however, that the exterior surface of body 24 may take other suitable shapes in addition to that described immediately above such as shapes that will coordinate with the shape of the pole. The area of cylindrical portion 26 remote from hemispherical portion 28 terminates in an open end 30 of the body 24. Such end 30 is typically provided to extend normal to the axis of the bolt 16 when cover 20 is applied thereto.

Body 24 is provided with an internal cavity 32 which includes a first cavity section 34 and a second cavity section 36 extending in series from the open end 30. First cavity section 34 is configured to be of the axial shape of the nut 18. As such, first cavity section 34 provides a cavity which is coaxial with bolt 16 and is disposed adjacent to open end 30 of body 24 to receive the nut 18 when cover 20 is installed. As such, flat areas 38 surround the radial interior of first cavity 34. Such flat portions 38 are configured to conform to the flat sides of nut 18 but are not necessarily in engagement therewith. First section 34 terminates in a surface 40 which is configured to the shape of the upper surface of nut 18.

Immediately adjacent to end 40 of first interior section 34 is the second cavity section 36. Second cavity section 36 extends axially away from end surface 40 a height greater than or equal to the height of threads 19 of bolt 16 above nut 18. Second cavity section 36 is cylindrical and has a cylindrical surface 42 which is preferably of a diameter less than that of the outer diameter of threads 19 but greater than the diameter of the inner diameter of threads 19. However, if surface 42 is sufficiently flexible, it may actually be of a diameter which is less than that of the inner thread diameter of threads 19. Accordingly, the diameter of second cavity section 36 is of a size which interferes with the outer diameter of threads 19. It is this interference in diameters which causes threads 19 to engage the internal cylindrical surface 42 of second cavity section 36.

In order for the present invention to function as intended, cylindrical surface 42 must be formed of a material which is flexible. It will readily be appreciated that the portion of body 24 which must be flexible is that of cylindrical surface 42. As used herein, the term "flexible" refers to a material which will yield if pressure is applied by means of threads 19 but which will engage threads 19 so as to resist the removal of cover 20 from bolt 16 and nut 18. While other portions of body 24 may be flexible, it is not necessary that they be so. As such, a preferred material for surface 42 is polyurethane. Other suitable materials such as hard rubber and plastic for surface 42 and, preferably body 24, will be appreciated by those skilled in the art.

Internal cavity 32 may also include an area 44 of first section 34 which is of a greater diameter than the maximum diameter of nut 18 as measured across opposing corners of nut 18. Area 44 must extend into first section 34 a distance which is substantially less than the height of nut 18. Area 44 is preferably less than one half (½) the height of bolt 18.

In the operation of the instant invention, the cover 20 is positioned so that the internal cavity 32 is in facing relation to the end of bolt 16 and the flat portions 38 are in alignment with the flat portions of nut 18. The cover 20 is then forced over nut 18 and anchor bolt 16. This application causes first internal cavity 34 to pass over nut 18 and surface 42 of second internal cavity section 36 to engage threads 19 of bolt 16. Such engagement causes the threads 19 to bite into cylindrical surface 42 so as to cause the engagement of threads 19 with second internal cavity 36. The application of pressure is continued until the cover 20 is seated with its open end 30 on, for example, base plate 12 and surface 40 above the top of nut 18. In many applications, this pressure may be applied manually by applying a downward force on the cover 20. However, for larger diameter bolts 16 and nuts 18, a mechanical force such as that applied by means of a hammer or lever to cover 20 would be appropriate. By virtue of the engagement of the threads 19 with the cylindrical portion 42 of second internal cavity section 36, the axial removal of the cover 20 is prevented. Further, by virtue of the engagement of the flat portions 38 with the flat parts of nut 18, the unscrewing of cover 20 from bolt 16 is prevented.

It will be understood that various changes in the details, materials and arrangement of parts which have been herein described and illustrated in order to explain the nature of the invention may be made by those skilled in the art within the principal and scope of the invention as expressed in the appended claims.

What is claimed is:

1. A cover for the end of a threaded bolt which extends through a nut by a predetermined distance comprising:

(a) a noncollapsible body member having a first open end which is normal to the axis of said bolt, said body comprising an outer shape in the form of a cylinder extending axially from said first end and to which there is formed a coaxial convex hemispherical surface, said body having an internal cavity extending longitudinally into said body from said first end, said cavity comprising:
(i) a first section coaxial with said bolt and of the diametrical shape of said nut and terminating in said first end; and
(ii) a second cylindrical section coaxial with said bolt and adjacent and open to said first section, said second section being of an axial depth greater than or equal to said predetermined distance and of a diameter less than the outer thread diameter of said bolt and configured to allow the threads of said bolt extending from said nut to engage the inner surface of said second cylindrical section, the inner surface of said second cylindrical section being formed from a flexible material, said first section being effective to engage said nut to prevent the rotation of said cover when said cover is applied to said bolt and said nut and said second section being effective to engage the extended portion of said bolt to prevent the axial removal of said cover from said bolt when said cover is applied to said bolt and said nut.

2. The cover of claim 1 in which said inner surface is formed from a substance which comprises polyurethane.

3. The cover of claim 1 in which said body is formed from a substance which comprises polyurethane.

4. The cover of claim 1 in which said body is formed from a substance which comprises plastic.

5. The cover of claim 1 in which said body is formed from a substance which comprises a hard rubber.

6. The cover of claim 1 in which said first section further comprises an additional cylindrical cavity area adjacent to said first end and extending into said first section substantially less than the axial height of said nut and is of a diameter greater than the maximum outer diameter of the corners of said nut.

7. The cover of claim 1 in which the inner surface of said second section is of a diameter which is greater than the inner thread diameter of said bolt.

8. The combination comprising:
(a) a threaded bolt;
(b) a nut screwedly attached to said bolt such that a predetermined length of the threads of said bolt pass through said nut; and
(c) a cover for the end of said bolt passing through said nut, said cover comprising a noncollapsible body member having a first open end which is normal to the axis of said bolt, said body comprising an outer shape in the form of a cylinder extending axially from said first end and to which there is formed a coaxial convex hemispherical surface, said body having an internal cavity extending longitudinally into said body from said first end, said cavity comprising:
(i) a first section coaxial with said bolt and of the diametrical shape of said nut and terminating in said first end; and
(ii) a second cylindrical section coaxial with said bolt and adjacent and open to said first section, said second section being of an axial depth greater than or equal to said predetermined distance and of a diameter less than the outer thread diameter of said bolt and configured to allow the predetermined length of the threads of said bolt to engage the inner surface of said second cylindrical section, the inner surface of said second cylindrical section being formed from a flexible material, said first section being effective to engage said nut to prevent the rotation of said cover when said cover is applied to said bolt and said nut and said second section being effective to engage the extended portion of said bolt passing through said nut to prevent the axial removal of said cover from said bolt when said cover is applied to said bolt and said nut.

9. The combination of claim 8 in which said inner surface is formed from a substance which comprises polyurethane.

10. The combination of claim 8 in which said body is formed from a substance which comprises polyurethane.

11. The combination of claim 8 in which said body is formed from a substance which comprises plastic.

12. The combination of claim 8 in which said body is formed from a substance which comprises a hard rubber.

13. The combination of claim 8 in which the inner surface of said second section is of a diameter which is greater than the inner thread diameter of said bolt.

14. Apparatus for securing the apertured base plate of a pole structure to a foundation comprising:
(a) an upwardly extending anchor bolt secured in said foundation and extending through the apertures in said base plate;
(b) a nut screwedly attached to said anchor bolt such that a predetermined length of the threads of said anchor bolt pass through said nut and said base plate is secured to said bolt; and
(c) a cover for the end of said anchor bolt, said cover comprising a noncollapsible body member having a first open end which is normal to the axis of said anchor bolt, said body comprising an outer shape in the form of a cylinder extending axially from said first end and to which there is formed a coaxial convex hemispherical surface, said body having an internal cavity extending longitudinally into said body from said first end, said cavity comprising:
(i) a first section coaxial with said anchor bolt and of the diametrical shape of said nut and terminating in said first end; and
(ii) a second cylindrical section coaxial with said anchor bolt and adjacent and open to said first section, said second section being of an axial depth greater than or equal to said predetermined distance and of a diameter less than the outer thread diameter of said anchor bolt and configured to allow the predetermined length of the threads of said anchor bolt to engage the inner surface of said second cylindrical section, the inner surface of said second cylindrical section being formed from a flexible material, said first section being effective to engage said nut to prevent the rotation of said cover when said cover is applied to said anchor bolt and said nut and said second section being effective to engage said extended portion of said anchor bolt passing through said nut to prevent the axial removal of said cover from said anchor bolt when said cover is applied to said anchor bolt and said nut.

15. The apparatus of claim 14 in which said inner surface is formed from a substance which comprises polyurethane.

16. The apparatus of claim 14 in which said body is formed from a substance which comprises polyurethane.

17. The apparatus of claim 14 in which said body is formed from a substance which comprises plastic.

18. The apparatus of claim 14 in which said body is formed from a substance which comprises a hard rubber.

19. The apparatus of claim 14 in which the inner surface of said second section is of a diameter which is greater than the inner thread diameter of said anchor bolt.

* * * * *

UNITED STATES PATENT AND TRADEMARK OFFICE
CERTIFICATE OF CORRECTION

PATENT NO. : 4,907,929
DATED : March 13, 1990
INVENTOR(S) : Raymond B. Johnston, Jr.

It is certified that error appears in the above-identified patent and that said Letters Patent is hereby corrected as shown below:

Title Page:
At [56] under "References Cited" delete "4/1968" and substitute therefor --4/1986--.

Col. 2, line 66, after the word "preferred" insert --embodiment--.

Signed and Sealed this

Eleventh Day of June, 1991

Attest:

HARRY F. MANBECK, JR.

Attesting Officer    Commissioner of Patents and Trademarks